US010454706B2

(12) United States Patent
Six et al.

(10) Patent No.: US 10,454,706 B2
(45) Date of Patent: Oct. 22, 2019

(54) TRANSPONDER MODULE AND ACCESS MODULE FOR ACTIVATING AND CONFIGURING SUCH TRANSPONDER MODULE OVER A CAN BUS

(71) Applicant: MyLaps B.V., Haarlem (NL)

(72) Inventors: Mark Six, Heemskerk (NL); Henk Jan Ober, Heemstede (NL); Marcel Schaap, Velsen-Zuid (NL)

(73) Assignee: MYLAPS B.V., Haarlem (NL)

( * ) Notice: Subject to any disclaimer, the term of this patent is extended or adjusted under 35 U.S.C. 154(b) by 102 days.

(21) Appl. No.: 15/329,162

(22) PCT Filed: Jul. 27, 2015

(86) PCT No.: PCT/EP2015/067107
§ 371 (c)(1),
(2) Date: Jan. 25, 2017

(87) PCT Pub. No.: WO2016/016163
PCT Pub. Date: Feb. 4, 2016

(65) Prior Publication Data
US 2017/0222828 A1    Aug. 3, 2017

(30) Foreign Application Priority Data

Jul. 28, 2014  (EP) .................................. 14178693

(51) Int. Cl.
G06F 15/173 (2006.01)
H04L 12/40 (2006.01)
(Continued)

(52) U.S. Cl.
CPC .......... H04L 12/40169 (2013.01); G07C 1/24 (2013.01); H04L 61/2038 (2013.01);
(Continued)

(58) Field of Classification Search
CPC .......... H04L 12/40169; H04L 61/2038; H04L 61/6027; H04L 2012/40215; H04L 2012/40273; G07C 1/24
(Continued)

(56) References Cited

U.S. PATENT DOCUMENTS 5,173,856 A    12/1992 Purnell
5,294,931 A    3/1994 Meier
(Continued)

FOREIGN PATENT DOCUMENTS

CN    101053199 A    10/2007
CN    102933443 A    2/2013
(Continued)

OTHER PUBLICATIONS

International Search Report and Written Opinion for International application No. PCT/EP2015/067107, dated Oct. 13, 2015.
(Continued)

*Primary Examiner* — Melvin H Pollack
(74) *Attorney, Agent, or Firm* — Steven M. Koehler; Westman, Champlin, & Koehler, P.A.

(57) ABSTRACT

A method is described for establishing a data link between an access module and a sports timing transponder module comprising: connecting said access module to a CAN bus, said CAN bus being connected to one or more transponder modules, a transponder module being associated with a transponder ID; sending one or more announce CAN messages over said CAN bus, the payload of an announce CAN message comprising an answer CAN address; receiving one or more request CAN messages from said one or more transponder modules, a request CAN message comprising said answer CAN address and a transponder ID of one of said one or more transponder modules; and, said access node
(Continued)

selecting a transponder module on the basis of said one or more request CAN messages for establishing said data link.

19 Claims, 11 Drawing Sheets

(51) Int. Cl.
  *H04L 29/12* (2006.01)
  *G07C 1/24* (2006.01)
(52) U.S. Cl.
  CPC .................. *H04L 61/6027* (2013.01); *H04L 2012/40215* (2013.01); *H04L 2012/40273* (2013.01)
(58) Field of Classification Search
  USPC ........................................................ 709/226
  See application file for complete search history.

(56) References Cited

U.S. PATENT DOCUMENTS

| | | | |
|---|---|---|---|
| 5,311,185 A | 5/1994 | Hochstein et al. | |
| 5,666,101 A | 9/1997 | Cazzani et al. | |
| 5,842,118 A | 11/1998 | Wood, Jr. | |
| 5,887,176 A | 3/1999 | Griffith et al. | |
| 6,219,613 B1 | 4/2001 | Terrier et al. | |
| 6,261,247 B1 | 7/2001 | Ishikawa et al. | |
| 6,577,238 B1 | 6/2003 | Whitesmith et al. | |
| 6,864,829 B2* | 3/2005 | Bervoets ................ | G07C 1/22 342/46 |
| 7,801,173 B2* | 9/2010 | Takatori ............ | H04L 12/40032 370/466 |
| 8,027,352 B2* | 9/2011 | Noumi .............. | H04L 12/40026 370/218 |
| 8,126,606 B2* | 2/2012 | Hung ....................... | H04L 12/66 701/32.7 |
| 8,441,671 B2* | 5/2013 | Elliot .................... | G06F 3/1203 358/1.15 |
| 8,665,891 B2* | 3/2014 | Katou ..................... | H04L 12/66 370/401 |
| 8,725,626 B2* | 5/2014 | Nystrom ........... | G06F 17/30725 705/35 |
| 8,850,477 B2* | 9/2014 | Schein ............... | H04N 5/44543 725/40 |
| 9,300,423 B2* | 3/2016 | Rubin ................... | H04J 3/1694 |
| 9,371,099 B2* | 6/2016 | Lagassey ............... | G07C 5/008 |
| 9,405,944 B2* | 8/2016 | Van Wiemeersch ........................ | G06K 7/10069 |
| 9,489,544 B2* | 11/2016 | Naitou ................ | H04L 63/0428 |
| 9,516,352 B2* | 12/2016 | Keen ................... | H04N 21/2146 |
| 9,529,358 B2* | 12/2016 | Fredriksson ........... | A63H 30/04 |
| 9,704,132 B2* | 7/2017 | Fraccaroli .............. | G06Q 10/10 |
| 9,843,523 B2* | 12/2017 | Mabuchi ............... | H04L 12/413 |
| 10,026,235 B2* | 7/2018 | Van Rens .......... | A63B 24/0021 |
| 10,044,564 B2* | 8/2018 | Likkei ..................... | H04L 12/40 |
| 2003/0033035 A1 | 2/2003 | Mar | |
| 2004/0160355 A1 | 8/2004 | Bervoets | |
| 2007/0188310 A1 | 8/2007 | Mori et al. | |
| 2011/0289123 A1 | 11/2011 | Denison | |
| 2012/0270496 A1 | 10/2012 | Kuenzi | |
| 2012/0307836 A1* | 12/2012 | Ishigooka ........... | H04L 12/4625 370/401 |
| 2012/0320927 A1 | 12/2012 | Katou | |
| 2013/0066514 A1 | 3/2013 | Das | |
| 2013/0231760 A1 | 9/2013 | Rosen et al. | |
| 2013/0318380 A1 | 11/2013 | Behrens | |
| 2014/0169140 A1 | 6/2014 | Bisig | |
| 2014/0300446 A1 | 10/2014 | Notheis | |
| 2015/0291127 A1* | 10/2015 | Ghabra .............. | G07C 9/00309 701/2 |
| 2015/0297949 A1* | 10/2015 | Aman ..................... | G06T 7/246 348/157 |
| 2015/0324597 A1 | 11/2015 | Vaidya | |
| 2017/0188199 A1* | 6/2017 | Ashley, Jr. ........... | G06Q 10/063 |
| 2017/0206367 A1 | 7/2017 | Six | |
| 2017/0272316 A1* | 9/2017 | Johnson ................ | H04L 61/301 |
| 2018/0206100 A1* | 7/2018 | Eisner ............... | H04M 1/72538 |

FOREIGN PATENT DOCUMENTS

| | | |
|---|---|---|
| CN | 106605229 A | 4/2017 |
| EP | 0422022 B1 | 9/1993 |
| EP | 0568066 A1 | 11/1993 |
| EP | 0949483 A2 | 10/1999 |
| EP | 1447681 A2 | 8/2004 |
| FR | 2619644 A1 | 2/1989 |
| WO | 0019235 A1 | 4/2000 |
| WO | 0103057 A1 | 1/2001 |
| WO | 02101408 A1 | 12/2002 |
| WO | 2012145675 A2 | 10/2012 |
| WO | 2014030168 A2 | 2/2014 |

OTHER PUBLICATIONS

"FLEX Transponder & FLEX Manager User Manual", May 23, 2012 (May 23, 2012), XP055159892, www.mylaps.com Retrieved from the Internet: URL: http://www.mylaps.com/data/sitemanagement/media/2012_05 FLEX Manager.pdf [retrieved on Dec. 23, 2014].
Taiwanese Office Action, dated Feb. 1, 2019, for corresponding Taiwanese Patent Application No. 104124337.
Japanese Office Action for Japanese Patent Application No. 2017-504144, dated Apr. 22, 2019, with English translation.
Taiwanese Office Action for Taiwanese Patent Application No. 104124334, dated Jan. 9, 2019.
European Office Action for European Patent Application No. 14178692. 1-1009, dated Mar. 22, 2018.
Cenker et al., "Iterative Algorithms in Irregular Sampling: A First Comparison of Methods," in proceedings of ICCP/91, pp. 483-489, 1991.
International Search Report and Written Opinion for International application No. PCT/EP2015/067103, dated Mar. 11, 2016.
"FLEX Transponder & FLEX Manager User Manual", May 23, 2012, XP055159892, http://www.mylaps.com/data/sitemanagement/media/2012_05 FLEX Manager.pdf, Retrieved from the Internet: URL: https://web.archive.org/web/20131228065931/http://www.mylaps.com/en/manuals [retrieved on Dec. 23, 2014].
Final Office Action for U.S. Appl. No. 15/329,149, dated May 23, 2019.
Office Action for U.S. Appl. No. 15/329,149, dated Oct. 5, 2018.
Japanese Office Action for Japanese Patent Application No. JP2017-504154, dated Apr. 25, 2019, with English translation.
Japanese Second Office Action for Japanese Patent Application No. JP2017-504154, dated Apr. 25, 2019, with English translation.
Notification of the First Office Action from the Chinese Patent Office for Chinese patent application No. 201580039404.4, dated Jul. 1, 2019.
Chinese Office Action from the State Intellectual Priority Office of the People's Republic of China for application No. 201580039410. X, dated Aug. 8, 2019.

* cited by examiner

TRANSPONDER MODULE AND ACCESS MODULE FOR ACTIVATING AND CONFIGURING SUCH TRANSPONDER MODULE OVER A CAN BUS

CROSS-REFERENCE TO RELATED APPLICATION

The present application is a national stage of and claims priority of International patent application Serial No. PCT/EP2015/067107, filed Jul. 27, 2015, and published in English as WO 2016/016163 A2, the content of which is hereby incorporated by reference in its entirety.

FIELD OF THE INVENTION

The discussion below is merely provided for general background information and is not intended to be used as an aid in determining the scope of the claimed subject matter.

The invention relates to a transponder module and a access module for activating and/or configuring such transponder module over a controller area network (CAN) bus, and, in particular, though not exclusively, to a method for establishing a CAN-based data link between a transponder module and an access module, a transponder configured for establishing a CAN-based data link with an access module and an access module configured for enabling activating and/or configuration of transponder functions in such transponder, and a computer program product for using such method.

BACKGROUND OF THE INVENTION

Timing systems for vehicle sports events such as circuit- or off-road motorsport events or cycling events use wireless transponders mounted in or on the vehicle in order to determine timing information, e.g. lap time, total time, average lap time, rankings, etc. The transponders are configured to transmit transponder signals comprising a unique identifier that are picked-up by antennas that are arranged in, over and/or along the racetrack or course. The antennas are connected to decoders that transform the transponder signal of vehicles crossing the antennas into transponder data. These data are subsequently forwarded to a data processing system in order to determine timing information of vehicles that participate in the race event.

A conventional timing system is typically set up and managed by a timing operator, wherein the operator configures the transponders for the participants in the event and registers the transponder with the timing system. Currently however there is a trend that participants buy their own personal transponder so that it can be (semi)permanently installed in or on the vehicle. Before or during the event, the transponder may be registered to the timing system.

An example of a known sports timing system is described in EP1447681. The functionality of such transponder is limited and it has no or at least little possibilities for (re)configuring and/or extending the transponder functions in accordance with the needs of the user and/or the requirements of a racing event. Moreover, transponders are often built to withstand harsh conditions and are installed in the vehicle at locations that are not very accessible. Once installed, physical access to the transponder is difficult so that fast reconfiguration of the transponder and/or update of the firmware of the transponder is often not possible without physically disconnecting the transponder.

Hence, from the above it follows that there is a need in the art for improved transponders that allow easy configuration and/or update of different functionalities in the transponder and/or services associated with the transponder. In particular, there is a need in the art for methods and systems that allow a transponder to be configured in a simple, reliable and secure way on the basis of parameters such as the type of event, type of vehicle, geographical location of the event, user preferences, etc., without the need of dismounting the transponder from the vehicle.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect the invention may relate to a method for establishing a data link between an access module and one or more transponder modules. In an embodiment, a transponder module may be for use in a sports timing system.

In an embodiment, the method may comprise: connecting said access module via a CAN bus to one or more transponder modules, a transponder module being associated with a transponder ID; the access module sending, preferably broadcasting, one or more first (announce) CAN messages via said CAN bus to said one or more of transponder modules, the payload of a first announce CAN message comprising an answer CAN ID; receiving one or more second (request) CAN messages from said one or more transponder modules, the payload of a second CAN message comprising a transponder ID of the transponder module broadcasting said second CAN message; and, establishing a data link between one of said one or more transponder modules and said access module on the basis of said answer CAN ID and the transponder ID of said transponder module.

The method enables an access module (an "access key") to access a transponder via a CAN bus. The CAN bus a standardized wired serial communication bus (as described in ISO-11898: 2003) which is very robust against RF interference and used in the automotive industry. Hence, when installing the sports timing transponder, it may be connected to the (standard) CAN bus of the vehicle. Then, an access key may be used to activate and/or (re)configure the transponder before it is used in a racing event.

The access key may be connected to the CAN bus and broadcast so-called announce CAN messages for dynamically assigning a CAN ID (an answer CAN ID) to a transponder. The CAN ID (the Standard CAN 11-bit identifier as defined in IS0-11898: 2003) may be stored in the payload (referred to in the CAN standard as a data frame) of the CAN message and used in order to set up a data link (in particular a point-to-point data link) between the access key and the transponder.

This way there is no need to (manually) preconfigure a transponder with a CAN ID. Instead, the access key may determine a CAN ID and dynamically distribute the CAN ID (or other CAN network parameters) to transponders. This way of assigning a CAN ID to a transponder is particularly advantageous in case many different third-party CAN devices (referred to in the CAN standard as "nodes") are connected to the CAN bus (e.g. a CAN bus of a vehicle) wherein each CAN device has its own fixed CAN ID. The access key has full control of the selection of the CAN ID. The access key may determine the priority associated with the CAN ID. Moreover, the access key may select a CAN ID that is not used by the other CAN devices connected to the CAN bus.

In an embodiment, the method may comprise: establishing a data link with said selected transponder module by broadcasting an acknowledge CAN message over said CAN bus, said acknowledge CAN message comprising the transponder ID of said selected transponder.

In an embodiment, the CAN ID field of an announce CAN message may comprise the CAN ID of said access module. In another embodiment, the CAN ID field of a request CAN message may comprise an answer CAN ID. The CAN messages may comprise information such that an access module is able to dynamically assign a CAN ID to a particular transponder and to set up a temporarily point-to-point connection between the access module and a transponder within the CAN network.

In an embodiment the method may comprise: said access module receiving one or more request CAN messages over said CAN bus from said one or more transponder modules, the CAN ID field of a request CAN message comprising an answer CAN ID.

In an embodiment, the method may comprise: in response to receiving said one or more broadcasted announce CAN messages, said one or more transponder modules broadcasting request CAN messages at different time instances to the access module. In an embodiment the method may comprise: a transponder module determining the time instance for broadcasting said request CAN message to said access module in response to the reception an announce CAN message on the basis of its transponder ID. In order to avoid that different transponders may send a request CAN message with the same answer CAN ID at the same time to the access module, each transponder may generate a waiting time t on the basis of its transponder ID. Here, a transponder may use (part of) the transponder ID in order to determine different time instances for broadcasting.

In an embodiment the selected transponder module is identified in the request CAN message that is first received by said access module.

In an embodiment, the method may comprise: establishing a data link between said access module and said selected transponder module for determining whether a user has the right to use at least part of one or more functions in the transponder; for sending license information associated one or more functions in the transponder; and/or; for sending one or more software updates to the transponder.

In an embodiment, determining whether a user has the right to use at least part of one or more functions in the transponder may comprise: sending time information, preferably encrypted time information associated with a real-time clock in said access module, to said selected transponder module for enabling said transponder module to check whether a user of the transponder module has a right to use at least part of one or more transponder functions.

In an embodiment, connecting said access module to a CAN bus may comprise: removably positioning a hardware card comprising said access module in a socket that is configured for receiving said hardware card such that when the hardware card is positioned in the socket electrical contacts of said hardware card are in electrical connection with said CAN bus.

In a further aspect, the invention may relate to a transponder module configured for establishing a data link with an access module for enabling activation and/or access at least part of one or more transponder functions, said transponder comprising: a CAN interface for electrically connecting said transponder module to said CAN bus; a computer readable storage medium having computer readable program code embodied therewith, and a microprocessor, coupled to the computer readable storage medium, wherein responsive to executing the computer readable program code, the processor is configured to perform executable operations comprising: receiving an announce CAN message from said access module, the payload of said announce CAN message comprising an answer CAN address; broadcasting a request CAN messages from said one or more transponder modules, each request CAN message comprising said answer CAN address and a transponder ID of one of said one or more transponder modules.

In an embodiment said processor may be further configured to perform executable operations comprising: determining a time instance for broadcasting said request CAN message over said CAN bus in response to the reception an announce CAN message, said time instance being determined on the basis of said transponder ID.

In further aspect, the invention may relate to an access module configured for establishing a data link with a transponder module, said access module being configured to activate and/or access at least part of one or more transponder functions of said transponder module, wherein said access module may comprise: a CAN interface for electrically connecting said transponder module to a CAN bus that is further connected to one or more transponder modules; a computer readable storage medium having computer readable program code embodied therewith, and a microprocessor, coupled to the computer readable storage medium, wherein responsive to executing the computer readable program code, the processor is configured to perform executable operations comprising: broadcasting one or more announce CAN messages over said CAN bus, the payload of an announce CAN message comprising an answer CAN address; receiving one or more request CAN messages from said one or more transponder modules, a request CAN message comprising said answer CAN address and a transponder ID of one of said one or more transponder modules; and, selecting a transponder module on the basis of said one or more request CAN messages for establishing said data link.

In yet another aspect, the invention may relate to a socket configured for receiving an access module as described above, wherein the socket is in electrical contact with a CAN bus that is connected to one or more transponders and wherein the socket may be configured to removably position the access module in the socket such that when the access module is positioned in the socket, the access module is in electrical contact with the CAN bus.

In an embodiment, the CAN bus is configured as a differential data bus. A differential data bus is very robust against noisy and harsh environments, thus allowing a continuous data link between the transponder and the access module during the sports event at high data rates.

In an embodiment, the access module and the one or more transponder modules comprise an CAN controller configured to send and receive CAN messages over said CAN bus.

In an embodiment, the CAN bus is the CAN bus of the vehicle in which the transponder is mounted.

In an embodiment, at least one transponder is mounted in the wheel well and/or the base plate of the vehicle and wherein a socket for the access key is mounted on the dash board of the vehicle and connected via said CAN bus to said transponder.

In a further aspect, the invention may relate to a transponder system for use in a vehicle comprising: a transponder; a access key communicatively connected to said transponder via a data bus, preferably a CAN bus; a socket configured to receive said access key and to removably position the access key in said socket wherein when the access key is positioned in said socket, the access key being electrically connected via said data bus to said transponder, wherein said access key is configured to activate said transponder and/or to configures the transponder on the basis license information and/or firmware updates.

The invention will be further illustrated with reference to the attached drawings, which schematically will show embodiments according to the invention. It will be understood that the invention is not in any way restricted to these specific embodiments.

DETAILED DESCRIPTION

Figure 1:
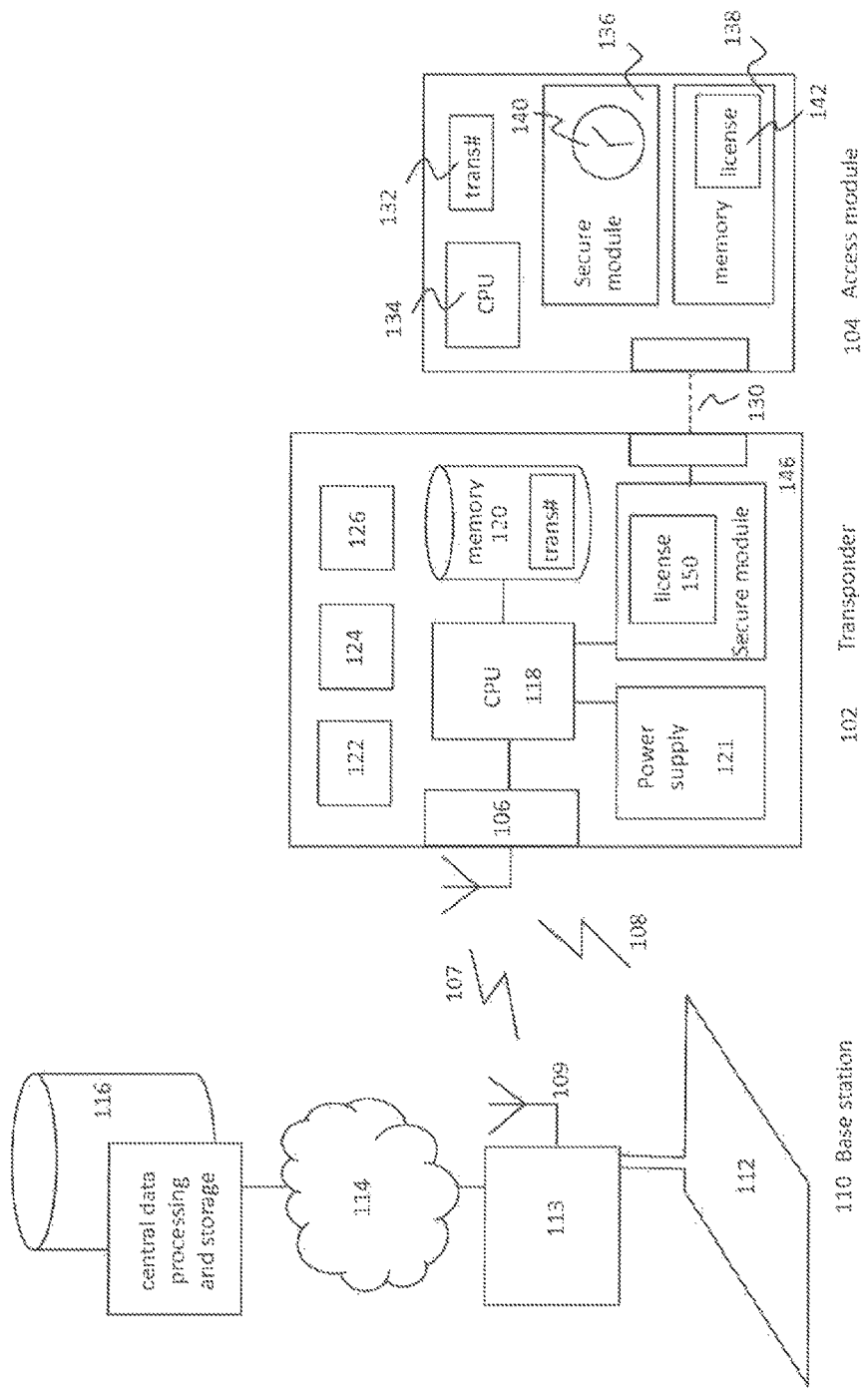
FIG. 1 schematically depicts a sports timing system according to an embodiment of the invention.

FIG. 1 schematically depicts a sports timing system according to an embodiment of the invention. In particular, FIG. 1 depicts a sports timing system comprising sports timing transponders 102 for use by participants in a sports event wherein at least one transponder is mounted in or on the vehicle (not shown) and wherein one or more base stations 110 are installed along the racetrack. The transponder may comprise a wireless interface 106 for transmitting a transponder signal 108,107 comprising—amongst others—a transponder identifier to the base station 110 which may comprise a receiver or a transceiver 113 for receiving the transponder signals.

In an embodiment, the base station may be connected to an inductive antenna 112, e.g. an inductive loop, embedded in or arranged over the race track. A loop may define an area of approximately a few meters width for data communication. Especially when a vehicle crosses the loop at high speeds this provides a very short time window (around 20-40 ms) for transmission of data. A known modulation scheme (frequency, phase shift keying and/or amplitude modulation) may be used for achieving data communication between the transponder and the base station.

A base station may transmit carrier frequency signal of a certain magnitude. When the transponder is in neighbourhood of the antenna, it will receive the base station signal and—in response—the transponder may start transmitting information, e.g. a timestamped transponder ID, to the base station by modulating the carrier signal. The frequency of the modulation frequency may be selected from a range between 0.4 and 6 GHz, preferably in the range of 0.4 and 1.0 GHz, e.g. 433, 868 or 915 MHz.

The transponder may also be configured to transmit messages without receiving a carrier frequency signal. In that case, the transponder may transmit messages between 3 and 7 MHz.

Alternatively and/or in additions, in an embodiment, the base station may be connected to one or more RF antennas 109 that are positioned along and/or over the race track. The one or more RF antennas may be configured to produce a relatively large-area RF area for providing a WLAN-type data communication between the base station (100-200 meters wide) and the transponders. The large RF area may provide a relatively large time-window for data communication between the base station and a transponder. Hence, the transponder may be configured to communicate with the base station both via an inductive antenna and RF antennas.

When a vehicle comprising a transponder approaches a base station, the transponder signal may be picked-up by the antenna (inductive loop and/or RF antennas) and detected by a receiver. A decoder in the receiver may decode and time-stamp the transponder signal before it is sent via one or more networks 114 to a data processing system 116 for determining timing information associated with the vehicles that participate in the event. This way, the data processing system may receive transponder data from all vehicles that pass the antennas along the race track, so that accurate timing information of all vehicles can obtained and relevant time information can be presented to the users.

As shown in FIG. 1, the transponder may further comprise a microprocessor 118, a memory 120 for storing data, a power supply 121 (e.g. a rechargeable battery and/or a power supply interface for an external power connection) and one or more functional (transponder) modules 122-126. For example, in an embodiment, the transponder may comprise a radio frequency (RF) module 122 for establishing a wireless connection (e.g. a Bluetooth, Wi-Fi or WLAN connection) with an external RF node.

In an embodiment, the transponder may comprise a bus interface module 124. The bus interface may be a bus interface that can handle a harsh electromagnetic environment such as a controller area network (CAN) bus. Such CAN interface may be used for setting up a wired communication link with the motor management system of the vehicle (not shown). This way, the transponder may receive vehicle information that can be stored by e.g. a data-logging module 126 in the transponder.

In another embodiment, the functional modules may include a GPS module for determining the location of the vehicle at a certain point in time and/or a bi-directional data link module may enable bi-directional data communication between the base station and the transponder. In that case, at least part of the base stations along the track may both comprise a receiver and a transmitter connected to the antenna.

As will be described hereunder in more detail, the transponder can be configured and/or activated on the basis of an external access module 104 that can be connected to the transponder via a data bus interface 130. In particular, the transponder may be configured and/or activated by sending license information that is stored in the access module to the transponder, which may subsequently use the license information and configure the transponder functions accordingly.

The access module may be configured to communicate with the transponder via a wired (differential) data bus, such as a CAN-bus or an RS-422 bus. A differential data bus is very robust against noisy and harsh environments, thus allowing a continuous data link between the transponder and the access module during the sports event. For example, the transponder may be mounted in the wheel well and connected via the CAN bus to a mounting assembly (a socket) that may be installed at a convenient and accessible part of the vehicle, e.g. on the dashboard of the vehicle. The access module may be removably mounted in the socket such that the CAN interface of the access module makes electrical contact with the CAN bus.

The access module may comprise one or more unique transponder identifiers 132, which may be securely stored in a hardware register of the access module. The access module may further comprise a microcontroller 134, a secure module 136 and a memory 138. Here, the secure module may be configured as a tamper-free hardware and/or software module. The secure module may be configured to store sensitive information that is used during the communication with the transponder. As will be described hereunder in more detail, the process of determining whether the user has the right to access (use) and/or configure certain functional modules in the transponder may include the transmission of time information of a tamper-free real-time clock 140 and/or license information 142 to the transponder.

Preferably, the license information 142 may be stored in encrypted form in the memory of the access module. A secure module 146 in the transponder may be configured to decrypt the encrypted license information and store the license information in clear text in a secure memory 150. The license information (which also may be referred to as rights information) may be used by the microprocessor of the transponder in order to determine which transponder functions the user may access. In particular, the license information may comprise access conditions, which may depend on: time, location of the transponder and/or use of the transponder. The license information and access conductions will be described hereunder in more detail.

Hence, the transponder system as shown in FIG. 1 allows simple and flexible configuration of one or more transponders on the basis of a license, i.e. user rights, that give conditional access to certain transponder functions. The license information may be provided to the transponder using a access module which may server both as a secure mobile data carrier for the license information and software updates and as an access module (a key) for accessing the transponder functions. The licence module may be configured to either wirelessly communicate with the transponder or communicate with the transponder via a data bus, preferably a differential signalling data bus such as a CAN bus. This way, the transponder can be removably connected to the access module in order to configure to the transponder the needs of the user without dismounting it from the vehicle. The access module enables that different transponder function can be efficiently exploited by the timing operator while the transponder is owned by the user.

Figure 2:
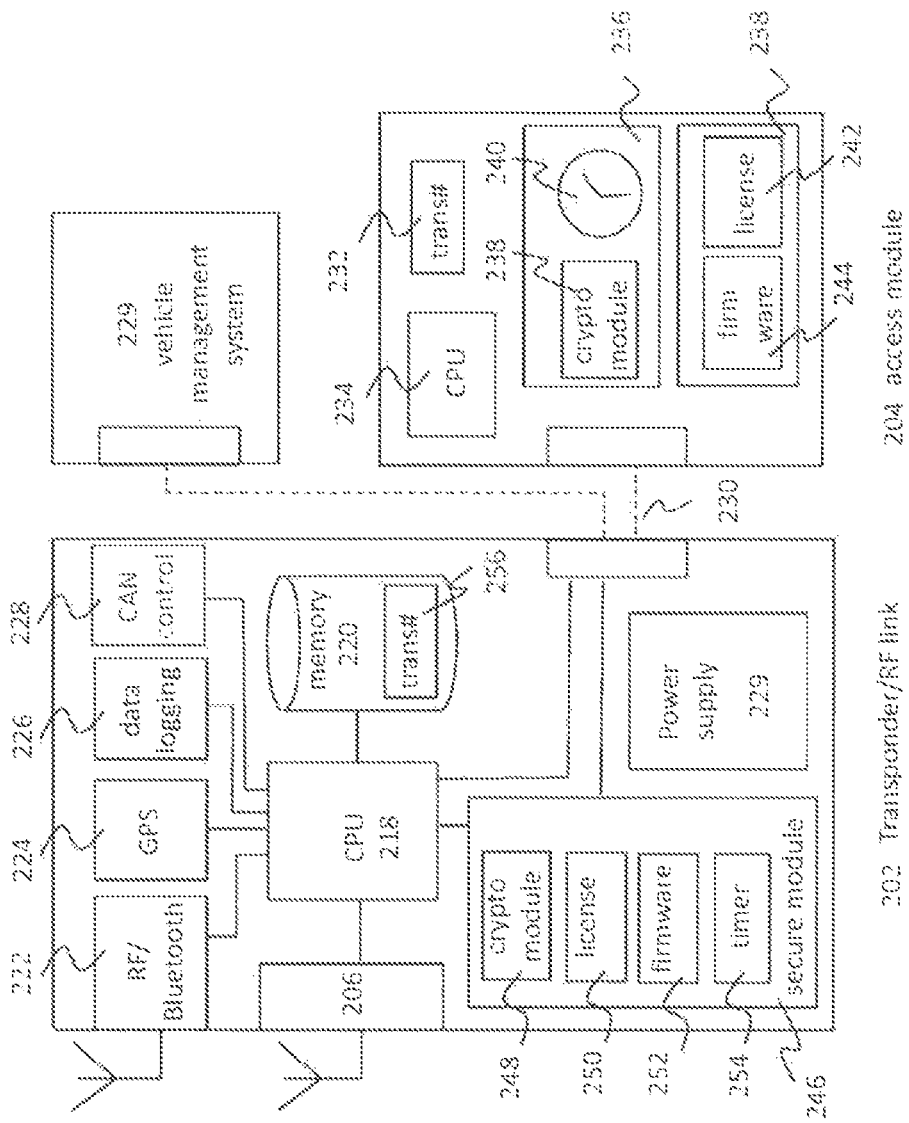
FIG. 2 schematically depict a transponder module and an access module according to an embodiment of the invention.

FIG. 2 schematically depicts a transponder system according to an embodiment of the invention. In particular, FIG. 2 depicts a more detailed example of a transponder system wherein the transponder 202 may comprise multiple functional modules 206,222,224,226,228,229 that may be configured on the basis of licensing information. The transponder 202 may comprise a microprocessor 218 that is connected to a (standard) wireless interface module 206 for communication with the base stations along the racing track, a radio frequency (RF) interface module 222 to a fast, high-speed data link between the transponder and a WLAN that is located along the race track (e.g. in the finish area), a GPS module 224 for generating location information that may be used by the transponder, a data logging module 226, and a CAN controller module 228.

The CAN controller module may allow the transponder to connect to the CAN-bus of the vehicle so that the transponder may communicate with the motor management system of the vehicle and/or other sensor modules that are connected to the CAN-bus. The transponder may further comprise a power supply module 229 (e.g. a rechargeable battery and/or a power supply interface for an external power connection) for controlling the power supply to the functional modules in the transponder.

Access and configuration of the functional modules of the transponder may be controlled by license information that is stored in the secure module 246 of the transponder. The microprocessor of the transponder may use the license information (also referred to as rights information) in the secure module in order to determine to which functional modules the user has access to and under which conditions. These conditions, which may be referred to as access conditions, will be described in more detail with reference to FIG. 10.

The access module 204 may be removably connected to the transponder using a suitable interface, e.g. a CAN-bus. When establishing a connection, an authentication procedure may be used for authenticating the access module to the transponder and vice versa. A transponder identifier 256, e.g. a unique transponder (serial) number, may be used during the authentication procedure for identifying the transponder to the access module. The transponder identifier that may be stored in a tamper-free register of the transponder may be matched with one or more transponder identifiers 232 that are stored in the access module.

When a connection between the transponder and the access module is successfully established, the microprocessor of the transponder may determine to which functions the user has access to on the basis of time information originating from a real-time clock 240 in the secure module 236 of the access module. The secure module of the access module may comprise a crypto module 238 for sending the time information to the secure module in transponder in encrypted form so that unauthorized use of the transponder functions and/or license key can be prevented. To that end, a first cryptosystem may be used for sending encrypted time information to the transponder. The first cryptosystem may comprise encryption and decryption algorithms and at least one key for encrypting and decrypting data that are exchanged between the transponder and the access module in order to securely sent time information to the transponder. Known "light" cryptosystems such as the (extended and/or corrected) Tiny Encryption Algorithm (TEA) or RC4 or variants thereof, may be used in order to send the timing information in encrypted form to the transponder.

The access module may comprise a memory comprising encrypted license information 242 and/or encrypted software code 244, e.g. firmware updates and/or patches, wherein the license information and/or software code is encrypted on the basis of a second cryptosystem.

As will be described hereunder in more detail, the access module may be used as a secure mobile data carrier for storing license information and/or software in encrypted form and for providing access to the transponder functions.

In contrast to the timing information, the access module does not comprise components of the second cryptosystem, e.g. key information (decryption keys), that can be used to decrypt the license information and/or software that is stored in the access module. Therefore, the second cryptosystem may be implemented on the basis of a more extended encryption scheme such as the Advance Encryption Standard (AES) or a variant thereof.

In an embodiment, the second cryptosystem may implemented as an asymmetrical cryptosystem, e.g. a private-public cryptosystem wherein the license information and/or software code may be encrypted using a public key and decrypted using different (secret) private key that is stored in the secure module of the module. Alternatively, the second cryptosystem may implemented as an symmetric cryptosystem, wherein the encryption key is identical to the decryption key.

In an embodiment, the access module may send version information (which may include a version number and/or timestamp) of the license and software code to the transponder so that the transponder can compare the version information with the license and/or software code version that is stored in the secure module of the transponder. Alternatively, the access module may receive version information of the license and software code that is installed on the transponder so that the access module can perform the comparison. If the transponder or the access module determines that new license information and/or software code is available for the transponder, the new version(s) may be sent to the secure module 246 of the transponder for decryption.

A cryptographic module 248 in the secure module of the transponder may use the second cryptosystem (i.e. encryption and decryption algorithms and key information) for decrypting license information and/or software code and the first cryptosystem for decrypting and encrypting data for transmitting encrypted time information from the transponder to the license key.

For example, when encrypted license information and/or software code is sent by the access module to the transponder, the cryptographic module may decrypt the encrypted license information and software codes using at least one decryption key of the second cryptosystem. The decryption key and the decrypted (clear text) license information 250 and/or software code 252 may be stored in a tamper-free memory of the secure module.

As described above, the transponder may use time information originating from the real-time clock in the access module to check whether the temporal access conditions with respect to the use of a certain transponder function are met or not. In some embodiments, so-called expiry information (i.e. information determining up to which point in time the license is valid) in the license information may be used to determine a time period for a timer 254 in the secure module of the transponder. The timer may be used to monitor the time period during which the license is valid. For example, in an embodiment, the timer may be implemented counter wherein (part of) the license may be finished when the timer has reached a predetermined value (e.g. zero). The microprocessor may insert timer information in the transponder messages 108 which can be processed by the central data processing system so that the validity of (part of) the license of a participant in the sports event can be monitored in time.

In an embodiment, the timer information is continuously inserted in the transponder messages. Alternatively and/or in addition, in an embodiment, the timer information may be inserted in the transponder message when the timer has reached the end of the time period. In that case, the end of the license period may be signalled to the central data processing system on the basis of a flag or a code in the transponder messages.

Figure 3:
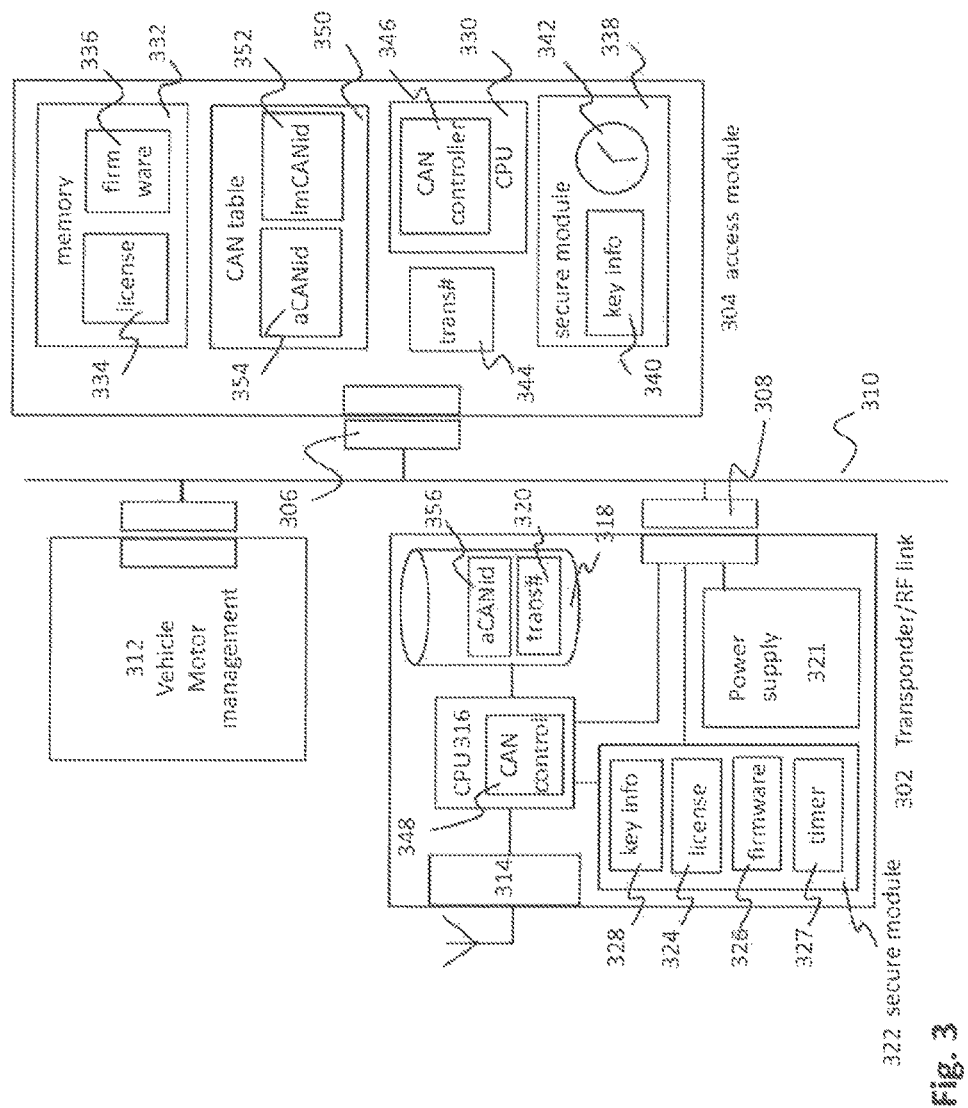
FIG. 3 depicts transponder module and an access module according to another embodiment of the invention.

FIG. 3 depicts a CAN-based transponder system according to a further embodiment of the invention. In this particular embodiment, the system may comprise a transponder 302 and an access module 304 that are connected via a CAN interface 306,308 to the CAN bus 310. In one embodiment, the CAN bus may be arranged to form a local network between one or more transponders and at least one access module. The CAN bus signaling may be differential so that it is robust against noise and harsh environments and allows high signaling rates.

The devices connected to the CAN bus (sometimes referred to as "nodes") may be configured to communicate with each other on the basis of the CAN protocol. The CAN standard ISO-11898: 2003 defines a communication network that links all the nodes connected to a bus and enables the nodes to talk with one another on the basis of CAN messages. There may or may not be a central control node, and nodes may be added at any time, even while the network is operating (sometimes referred to as "hot-plugging"). A device that is configured according to the CAN standard may be referred to as a CAN device.

In an embodiment, the CAN bus in FIG. 3 may be part of the CAN network of the vehicle that participates in a racing event. In that case the transponder and/or access module may also be configured to communicate to other ($3^{rd}$ party) CAN devices 312 that are connected to the CAN bus on the basis of the CAN protocol. For example, the transponder and/or access module may communicate with the vehicle motor management system and/or other vehicle sensor devices on the basis of the CAN protocol.

A large part of the functionality of the transponder and the access module in FIG. 3 may be similar to those described with reference to FIG. 2. Hence, the transponder may comprise, a wireless interface 314 for the base station, a microprocessor 316, a memory 318 comprising a transponder identifier 320, a power supply 321 (e.g. a rechargeable battery and/or a power supply interface for an external power connection) and a secure module 322 comprising license information 324, software code 326 (e.g. firmware), key information 328 and a timer 327. Similarly, the access module may comprise a microprocessor 330, a memory 332 comprising encrypted license information 334 and software code 336 (e.g. firmware updates), a secure module 338 comprising key information 340 and a real-time clock 342. The access module may further comprise one or more transponder IDs 344 for identifying the transponders that can be can be connected to the access module.

In order for the transponder and the access module to communicate via the CAN bus, the transponder and the access module may comprise a CAN controller 346,348 configured to control a transceiver (not shown) for broadcasting CAN messages over the CAN bus to other CAN devices that are connected to the bus and for receiving broadcasted CAN message from other CAN devices. The CAN controller may broadcast CAN messages over the CAN bus wherein each CAN message comprises a source identifier field that comprises a CAN identifier (CAN ID), wherein the CAN ID identifies the CAN device that has broadcast the CAN message. The CAN ID may be implemented as the Standard CAN 11-bit identifier as defined in ISO-11898: 2003.

The access module may be configured as a CAN device comprising a CAN table 350 in its memory comprising the one or more CAN IDs 352 for broadcasting its CAN messages to the transponders that are connected to the CAN bus. The CAN controller of a transponder may comprise a filter for filtering CAN messages with a CAN ID of the access module.

In a conventional CAN network, CAN devices typically comprise a static pre-configured CAN ID. Such scheme however is not very suitable for sports timing transponders, which may be connected to a third-party CAN-bus (such as the CAN bus of the vehicle) that may have already a large number of nodes connected thereto. For example, if the static (preconfigured) CAN ID of a transponder coincides with a CAN ID of another CAN device, data communication between the transponder, the access module and other CAN device (such as the vehicle management system) would be disrupted. Therefore, in some embodiments, the access module may be configured to dynamically assign a CAN ID to a transponder.

Dynamic assignment of a CAN ID to the transponder may start with the access module broadcasting a so-called announce CAN message to the transponder, wherein the source ID field of the announce CAN message comprises a CAN ID of the access module 350 (lmCANid). The access module may insert a selected CAN ID in a predetermined part of the payload of the CAN message. This CAN ID may be referred to as an answer CAN ID (aCANid) 354, which should be used by the transponder as a source ID. The aCANid may be selected by the access module from a list of available CAN IDs in the CAN table. In an embodiment, the access module may select a CAN ID that does not match with the (static) CAN ID of CAN devices that are already connected to the CAN bus. The access module may thus use an announce CAN message for dynamically assigning a CAN ID—an answer CAN ID (aCANid)—to a transponder, which may store the answer CAN ID in its memory 356.

In order to confirm the assignment of the answer CAN ID to the transponder, the transponder may respond by broadcasting a response CAN message to the access module, wherein the source ID field of the response CAN messages comprises the answer CAN ID (aCANid). Further, the transponder may insert its transponder ID 320 (e.g. the serial number) in a predetermined part of the payload of the response CAN message. When the access module receives a response CAN message with the answer CAN ID in the source ID field, it may determine that this message was sent by a transponder in response to an earlier sent announce CAN message and that the payload comprises the transponder ID of the transponder.

The access module may then check the transponder ID in the response CAN message with the transponder ID 344 that is stored in its memory in order to determine whether the access module can be used together with the transponder. For example, if the transponder ID in the response CAN message matches the transponder ID in the access module, the access module may determine that it may set up a communication link with the transponder for data exchange, including e.g. the transmission of encrypted license information, software code (e.g. firmware) and/or time to the transponder. A more detailed description of this process will be described with reference to FIGS. 5 and 6.

Figure 4:
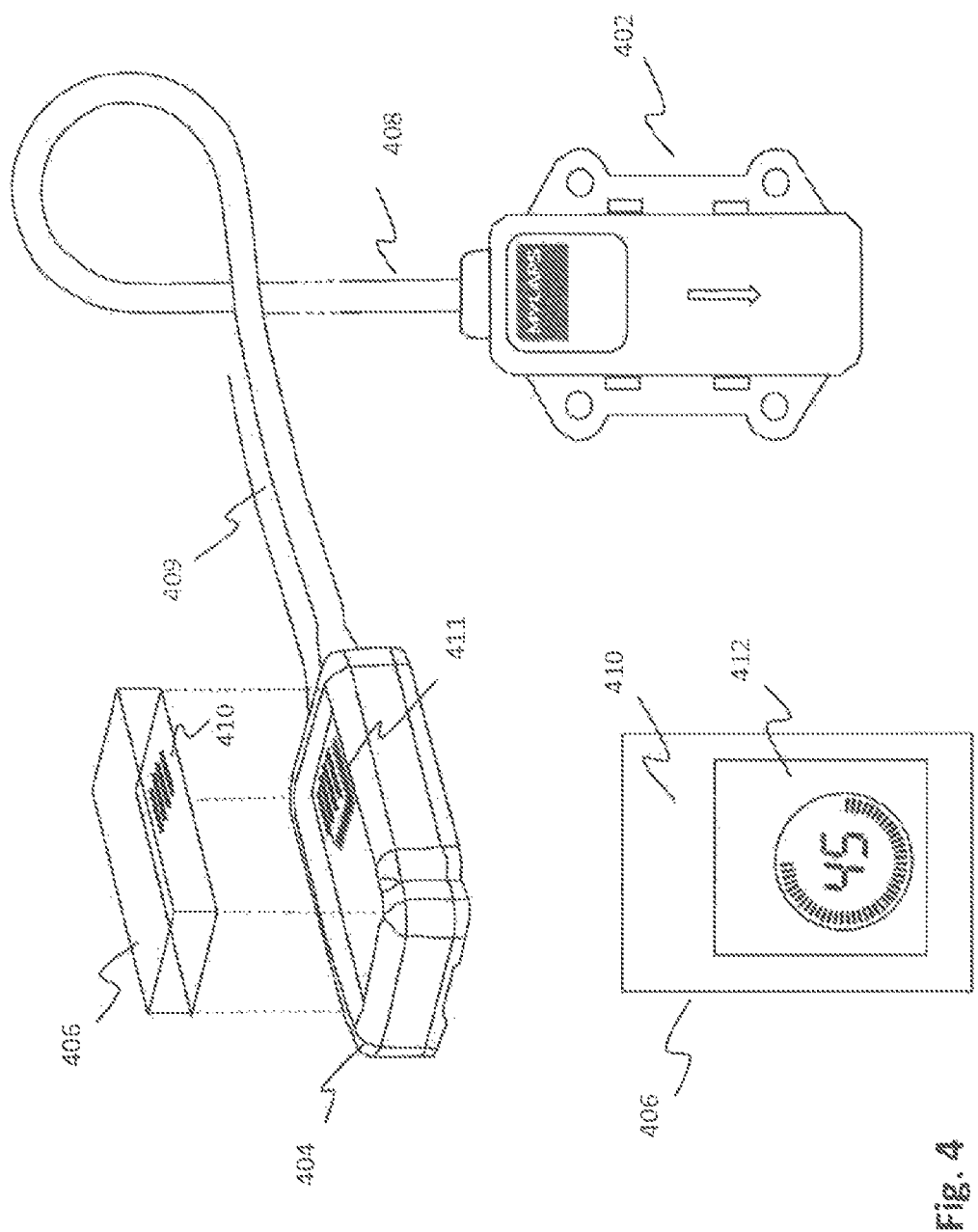
FIG. 4 depicts an access module and a socket for removably connecting such access module to a CAN bus according to an embodiment of the invention.

FIG. 4 depicts a system for removably connecting the access module via a CAN bus to a transponder according to an embodiment of the invention. In particular, FIG. 4 depicts a (hardware) memory card 406 comprising an access module (as described with reference to FIGS. 1-3) and a socket 404 that is configured to receive the hardware card and to removably position the memory card in the socket. When the hardware card is positioned in the socket, the electrical contacts 410 of the hardware card make electrical contact with contacts 411 of the socket that may be electrically connected via CAN bus wires 408 to a transponder 402. A further CAN bus wire 409 may connect the transponder and the access key to the CAN bus of the vehicle in which the system as depicted in FIG. 4 is mounted. The inset of FIG. 4 shows a top-side of the access module which may comprise a display 412 for displaying certain information to the driver.

The system of FIG. 4 may be installed in the vehicle such that the transponder can be mounted in a place with is relatively difficult to access, e.g. the wheel well and/or the base plate of the vehicle and socket for the access key can be mounted at a place (e.g. the dashboard of the vehicle) with is easily accessible for the driver. The transponder needs to be mounted in such places in order guarantee a good signal transfer from the transponder to the base station and vice versa. The (part of) the CAN bus of the vehicle may be used to establish a data link between the transponder and the access key via the CAN bus. As the CAN bus is very robust against harsh environments (e.g. electrical EM noise) a reliable data connection can be established under different conditions. Obviously, the system in FIG. 4 may be extended to multiple transponders (e.g. a main transponder and one or more back-up transponders) which are connected via the CAN bus to the access module. The access module may be used as a key to activate transponder and it may be used as an access module for configures the transponder on the basis license information and/or firmware updates.

Figure 5:
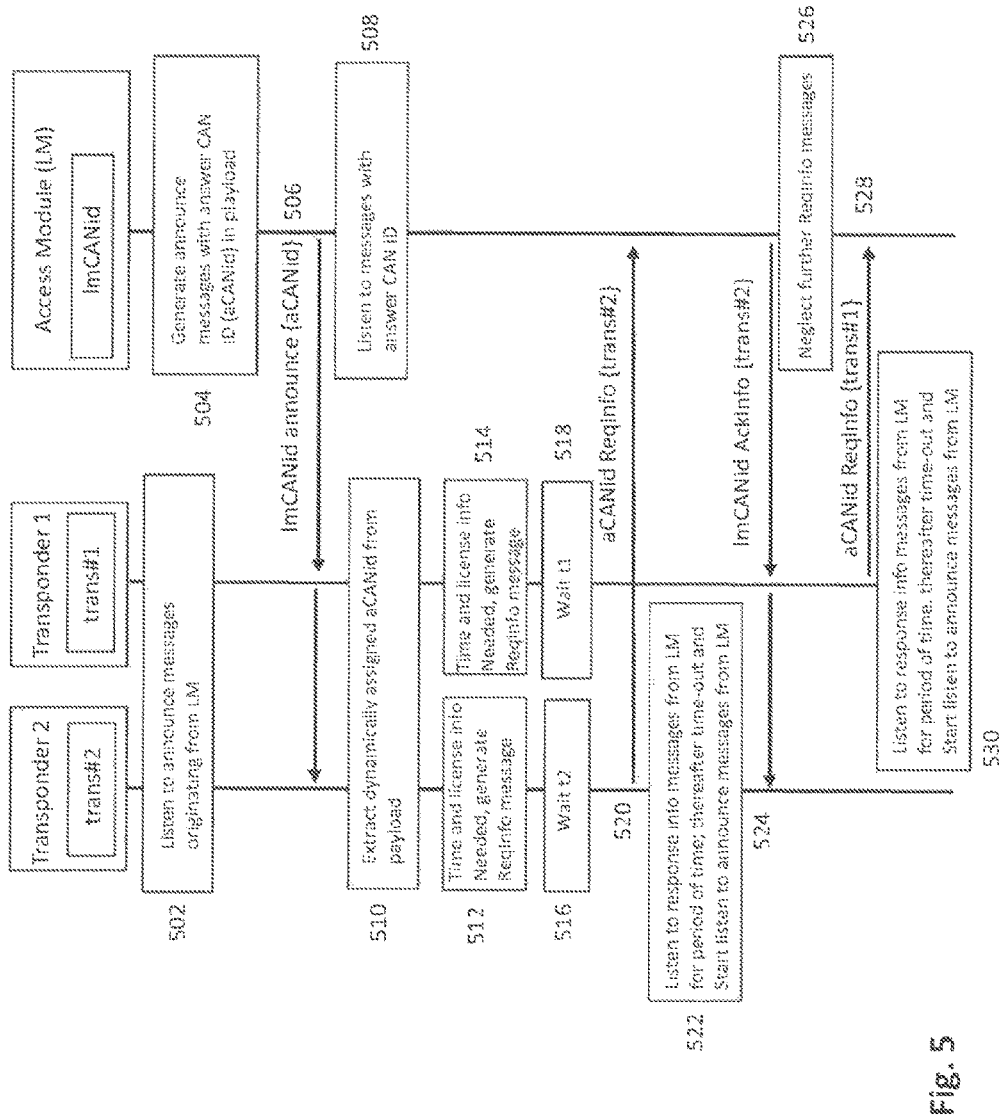
FIG. 5 depicts a flow diagram of a first part of a process for establishing a CAN-based data link between an access module and a transponder module according to an embodiment of the invention.

FIG. 5 depicts a flow diagram of a first phase of a process for providing CAN-based access to transponder functions of one or more sports timing transponders according to an embodiment of the invention. In particular, the flow diagram relates to a process for providing access to transponder functions of a transponder that is connected via a CAN bus to a access module as for example described with reference to FIG. 3.

The process may start with one or more transponders, each being identified by a transponder ID, that listen to the CAN bus for announce CAN messages originating from an access module that is identified by a certain CAN ID (lmCANid) (step 502). Then the access module may generate an announce CAN message in which an answer CAN ID (aCANid) is inserted in a particular part of the payload of the announce CAN message (step 504). The generated announce CAN message may be subsequently broadcasted over the CAN bus to the other CAN devices, in this example two transponders, that are connected to the CAN bus (step 506). Thereafter, the access module may start listening to the CAN bus for CAN messages with the answer CAN ID as the source ID field of the CAN message (step 508).

Meanwhile, the transponders may receive the announce CAN message and determine on the basis of the source ID of the CAN message that the message originates from the access module. Further, the transponder may determine that the message is an announce message and extract the answer CAN ID (aCANid) from its payload (step 510). In case the one or more transponders would like to receive information from the access module (e.g. license information, time and/or software updates), a response CAN message may be generated. This message may hereafter be referred to as a "request info" CAN message (steps 512,514), wherein the source ID field of the request info CAN message may comprise the aCANid and a predetermined part of the payload may comprise the transponder ID.

In order to avoid that different transponders may send a request info CAN message with the same aCANid at the same time to the access module, each transponder may generate a waiting time t on the basis of its transponder ID (steps 516,518). For example, in an embodiment, at least part of the transponder ID may be used as a seed for a random generator in the transponder so that each transponder generates a different wait time (e.g. in the example of FIG. 5 a first waiting time t1 and different second waiting t2).

As the second waiting time was shorter, the second transponder may be the first transponder to that sends a request info CAN message comprising its transponder ID (in this example the serial number serial#2 of transponder 2) in the payload of the message (step 520) to the access module. Thereafter, the second transponder may start listening for response info messages from the access module for a period of time (step 522). In an embodiment, the transponder may be configured to stop listening for response info messages after a predetermined time (a "time-out") and to return to its previous listening state in which it listens to announce messages originating from the access module (i.e. the state described with reference to step 502 in FIG. 5).

In the example of FIG. 5, the second transponder is the first transponder to send a request info message to the access module. In response, the access module may acknowledge the info request of the second transponder by sending an acknowledge info CAN message comprising the transponder ID of the second transponder to the transponders (step 524). After acknowledging the request of the second transponder, the access module does not accept request info CAN messages of other transponders until it has completed the info request(s) of the second transponder (step 526). The request info message that is sent after a waiting time t1 by the first transponder to the access module (step 528) will therefore be neglected by the access module. The first transponder will therefore not receive an acknowledge message in response to its request info message. After a predetermined time, a time-out may appear and the first transponder may switch back to its previous state in which it listens to announce messages originating from the access module (step 530).

Figure 6:
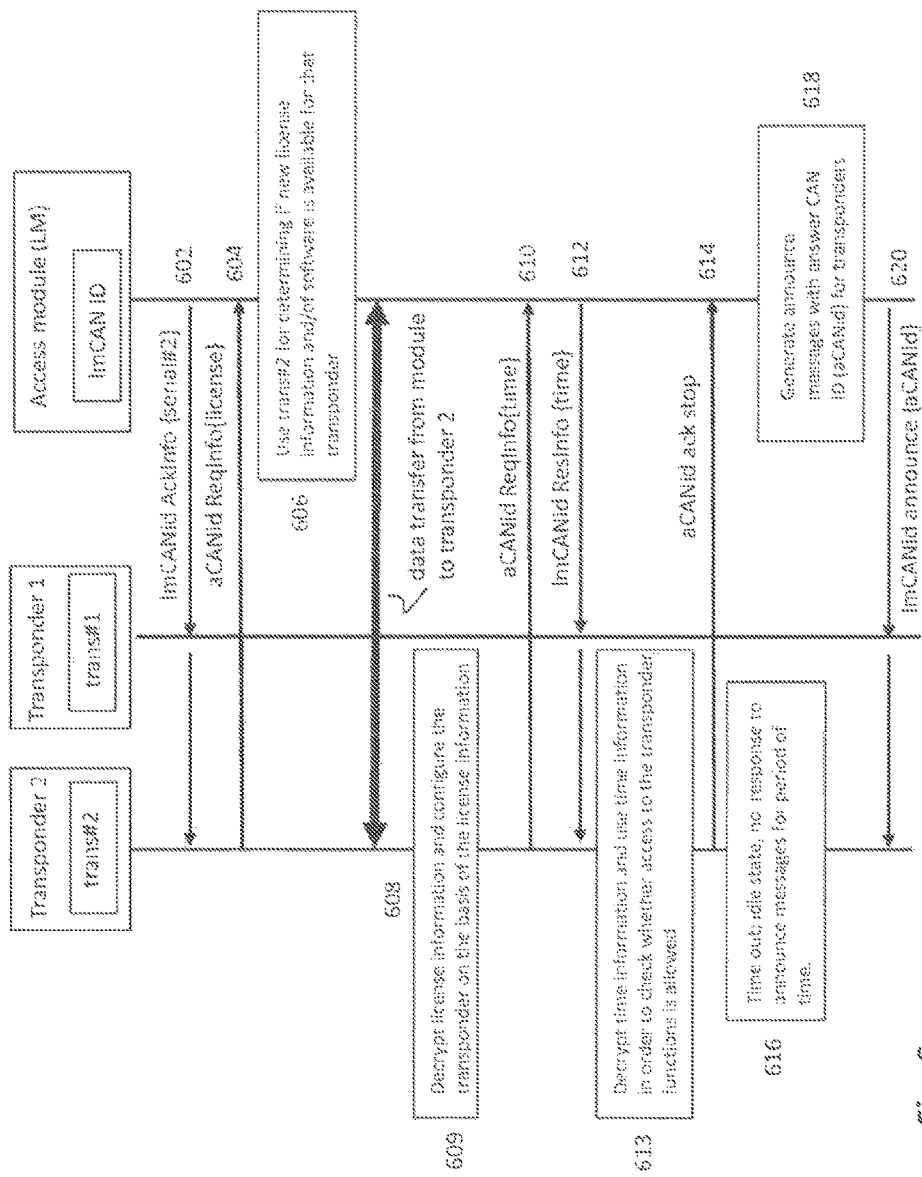
FIG. 6 depicts a flow diagram of a second part of a process for establishing a CAN-based data link between an access module and a transponder module according to an embodiment of the invention.

FIG. 6 depicts a flow diagram of a second phase of a process for providing access via a CAN bus to transponder functions of one or more sport timing transponder according to an embodiment of the invention. The process of FIG. 6 may take place after the process of FIG. 5 in which the access module acknowledges to process an info request CAN message of the second transponder by sending an acknowledge info message comprising the transponder ID of the second transponder to the second transponder (step 602).

When the second transponder receives the acknowledge info CAN message comprising a transponder ID of the second transponder, it may determine that the access module has accepted its info request. Thereafter, the transponder may request the access module whether new license information is available (step 604). To that end, the access module may use the transponder ID in order to determine whether it has new license information for transmission to the second transponder (step 606). If available, the new (encrypted) license information may be sent by the access module to the secure module of the second transponder (step 608). The secure module of the transponder may decrypt the encrypted license information, store the new license and configure the functional module in the transponder on the basis of the license information (step 609).

Alternatively and/or in addition, the transponder may request time information (e.g. the current time) from the access module (step 610). In response, the access module may send encrypted time information to the secure module of the transponder (step 612). The secure module of the transponder may decrypt the time information and use it to check whether the transponder license or parts thereof are valid (step 613). In an embodiment, the transmission of the time information may include an authentication process that is described in more detail with reference to FIG. 8. In that case, the CAN message that is sent to the access module in step 610 may comprise an encrypted authentication key AUTH, which may be used to authenticate the response message of the access module that comprises the time information in encrypted form.

Thereafter, the communication session between the access module and the second transponder may be ended. In an embodiment, the second transponder may send an acknowledge stop CAN message to the access module (step 614). Alternatively, the transponder may stop sending messages to the access module so that after a predetermined time a time-out appears. In that case, the second transponder may switch itself to an idle state wherein it does not respond to announce messages for a predetermined time (step 616). Thereafter, the access module may start generate announce messages (step 618) which may be send to the transponders (step 620). In that case, the first transponder may respond to the announce message in order to set up a communication session between the first transponder and the access module in a similar way as described above.

Figure 7:
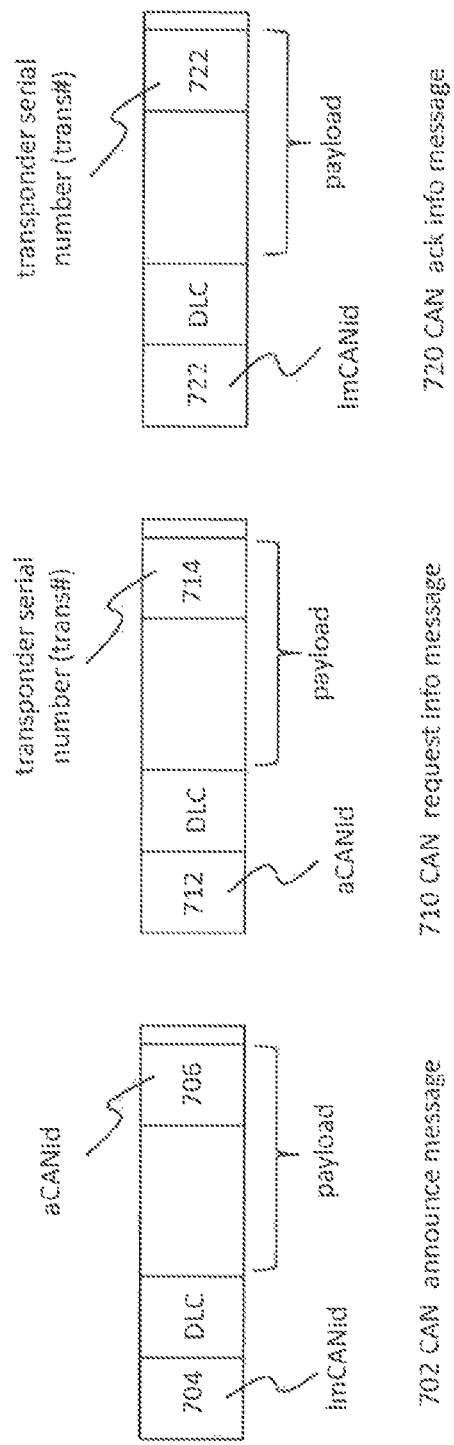
FIG. 7 depicts schematics of data format of CAN messages according to an embodiment of the invention.

FIG. 7 depicts schematics of data format of CAN messages according to an embodiment of the invention. The CAN messages may be formatted on the basis of the standard CAN message format comprising an 11-bit CAN identifier or the extended CAN message format comprising a 29-bit CAN identifier for identifying the source of the CAN message. The CAN messages may comprise a payload between 0 and 8 bytes of data wherein the DLC data field indicates the number of bytes in the message.

As shown in FIG. 7, the CAN announce message 702 may comprise a source ID field 704 comprising the CAN ID of the access module (lmCANid). The payload (or a predetermined part thereof) may comprise the answer CAN ID 706 (aCANid) that should be used by the transponder as CAN ID. The CAN request info CAN message 710 may comprise a source ID field 712 comprising the answer CAN ID (aCANid) and the payload (or a predetermined part thereof) may comprise the transponder ID 714 of the transponder that transmits the request info CAN message. The CAN acknowledge info message 720 may comprise a source ID field 722 comprising the CAN ID of the access module (lmCANid) and the payload (or a predetermined part thereof) may comprise the transponder ID 722 of the transponder that is selected by the access module in order to set up a communication link.

The CAN controller in the transponders and the access module may be configured to generate and broadcast these CAN messages over the CAN bus to other CAN devices. Similarly, the CAN controller in the transponders and the access module may be configured to receive these CAN message and process the messages on the basis of the information in the payload. The messages in FIG. 7 enable a access module to dynamically assign a CAN ID to a particular transponder and to set up a temporarily point-to-point connection between the access module and a transponder within the CAN network.

Figure 8:
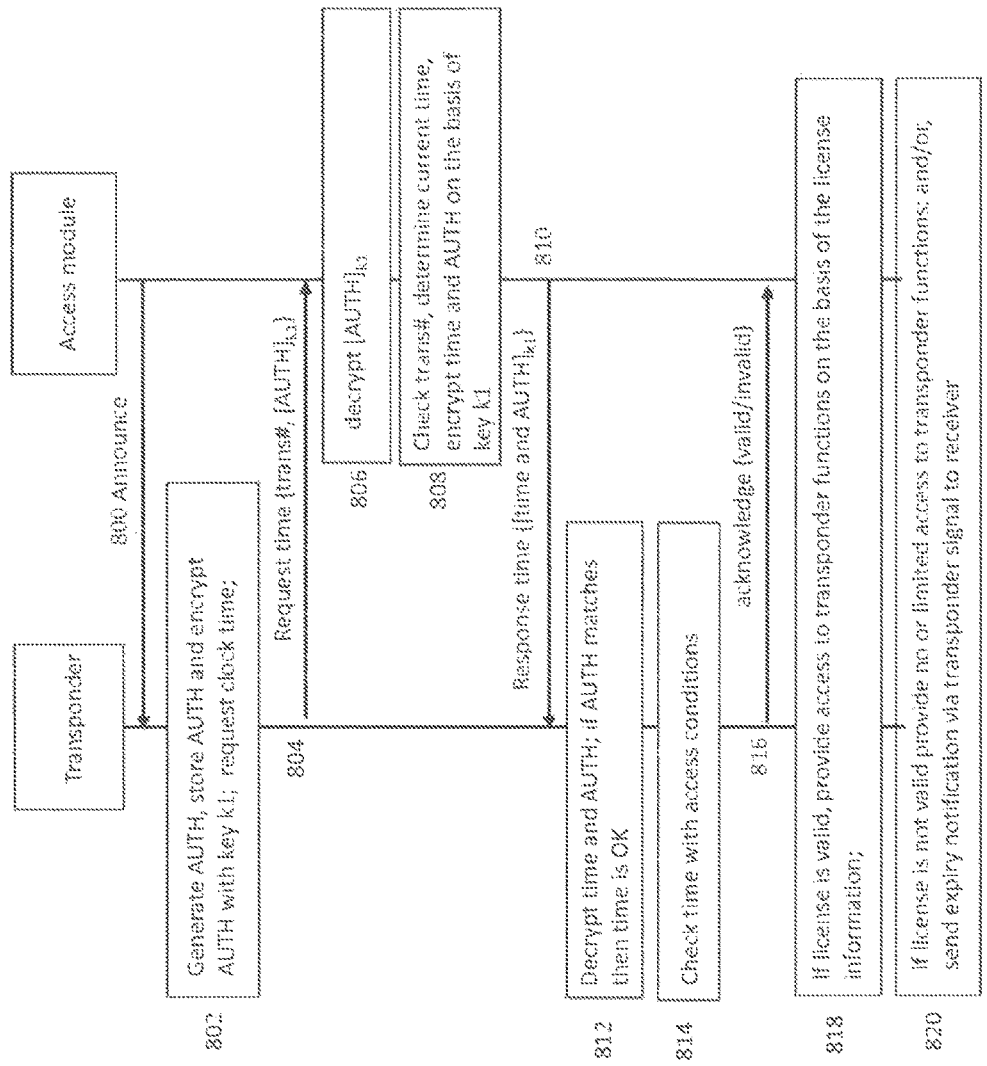
FIG. 8 depicts a flow diagram of a process for providing access to transponder functions of a transponder according to an embodiment of the invention.

FIG. 8 depicts a flow diagram of a process for providing access to transponder functions of a sport timing transponder according to an embodiment of the invention. First a connection between the access module and the transponder may be established. Thereafter, the access module may send one or more announce messages to the transponder (step 800) wherein the announce message indicates that a transponder can request a data connection with the access module.

In response to the announce message, the transponder may request time information form the access module in order to check whether the license is still valid. In order to avoid misuse of the access module, a secure connection may be established between the access module and the transponder wherein data are encrypted using the first cryptosystem as described with reference to FIG. 2. To that end, the secure module in the transponder may generate an authentication key AUTH, preferably a cryptographic nonce, that may be generated by a pseudo-random generator in the crypto module of the transponder. The transponder may store the authentication key and encrypt the authentication key using an encryption algorithm and at least one encryption key k1 (step 802), before it is sent in a request time message to the access module (step 804). The request time message may further comprises the transponder ID.

The secure module in the access module may decrypt the authentication key (step 806) using a decryption algorithm and a decryption key of the first cryptosystem. Thereafter, the access module may check the transponder ID in the response time message with the transponder ID stored in the memory of the access module. If both transponder IDs match, it may be decided that the access module can be used with the transponder. In that case, the current time may be determined on the basis of the real-time clock and combined with the authentication key. The time and authentication key may be combined on the basis of a predetermined function, which is known by the transponder. The time and the authentication key may be encrypted using an encryption algorithm and an encryption key of the first cryptosystem (step 808). The encrypted information may be sent in a response time message to the secure module of the transponder (step 810), which may decrypt the time and the authentication key and compare the authentication key that was stored in the memory of the secure module with the decrypted authentication (step 812).

If the stored authentication key matches the authentication key that was received form the access module, the transponder may decide that the response time message originates from the correct access module. In that case, the transponder may use the current time in the response time message in order to review the license that is stored in the secure module of the transponder. In particular, it may use the current time to check whether the temporal access conditions in the license information are met (step 814). In an embodiment, an acknowledgement message may be sent by the transponder to the access module to inform the access module that the current license in the transponder is valid, partly valid or invalid (step 816).

In response to the outcome of the review of the license, the transponder and/or access module may initiate certain measures. For example, if the license is valid, access to the transponder functions may be provided as defined in the license information (step 818). In case the licence or part thereof is not valid, no or limited access to the transponder functions may be provided (step 820). Further, in some embodiments, if the license is not valid, access to the basic transponder function may be provided wherein the transponder messages that are sent to the base station comprise an expiry notification which can be detected by base station of the central data processing server.

Figure 9:
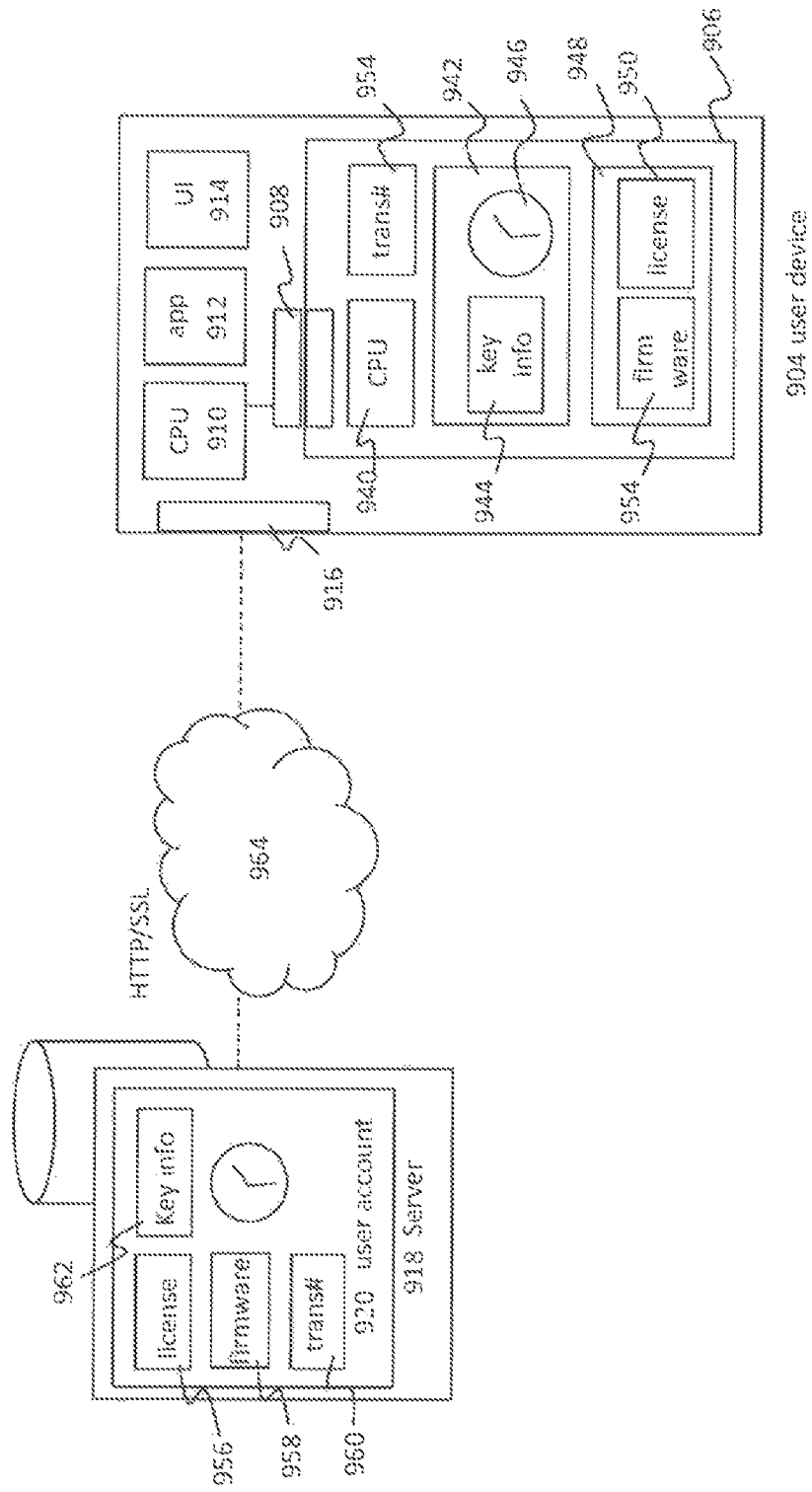
FIG. 9 depicts system connecting the access module to a user account according to an embodiment of the invention.

FIG. 9 depicts system connecting the access module to a user account according to an embodiment of the invention. In particular, the system in FIG. 9 comprises a user device 904 (e.g. a mobile phone, an electronic table, a laptop or a personal computer) connected to an access module 906. The access module may connected to the user device in various ways. In an embodiment, the access module may be implemented as a secure card, e.g. a smart card or a secure digital (SD) card, which may be electrically connected via an interface 908 to the microprocessor 910 of the user device. Alternatively, in another embodiment, the access module may be configured as a secure software module stored on a memory card, wherein the key information and the encryption and decryption algorithms may be protected using known techniques such as white-box cryptography and/or code obfuscation techniques.

A transponder client application 912 may be installed on the user device, wherein the client application may render a (graphical) user interface 914 for controlling the wireless interface 916 of the user device 922 for managing communication the access module and a transponder server application that is hosted on a server 918. The transponder server application may provide a user of an access module access to a user accounts 920.

The access module may be configured in a similar way as described with reference to FIGS. 1 and 2. In particular, the access module may comprise a microprocessor 940, a secure module 942 comprising key information 944 and a real-time clock 946 and a memory 948 comprising encrypted license information 950 and/or software codes 952 (e.g. firmware) and one or more transponder identifiers 954.

In this particular embodiment, the user may instruct the transponder client application to contact the server application for accessing the user account 920 in order to request whether new license information 956 and/or software updates 958 associated with a particular transponder identifier 960 is/are available. If this is the case, the server application may use key information 944 in order to encrypt the license information and/or software updates on the basis of an encryption algorithm of the second cryptosystem, before it is sent via one or more networks 964 and the user device to the secure module. Here, communication between the transponder client and transponder server application may be established on the basis of a secure link, e.g. an HTTP/SSL link. Hence, before contacting the transponder, the user may update the access module via the user account with the most up-to-date license information or software updates. Alternatively and/or in addition, the user may buy a new license or upgrade the license via its user account in order to get access to desired transponder functions as for example described in detail with reference to FIGS. 2 and 3.

After the update of the license information and software in the access module, a CAN-bus connection between the access module and the transponder may be established and access to transponder functions of the sport timing transponder may be managed on the basis of license and time information in a similar way as described with reference to the processes of FIG. 5-8.

Figure 10:
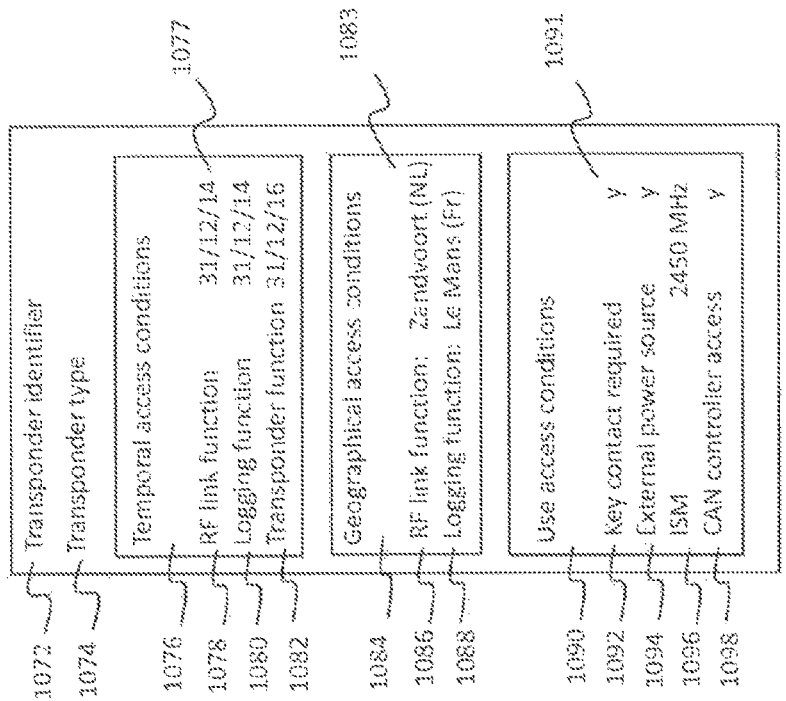
FIG. 10 depicts a data model of the license information for a transponder module according to an embodiment of the invention.

FIG. 10 depicts an example of a data model 1070 of a license that is used by the transponder system according to various embodiments of the invention. The license information may comprise one or more transponder identifiers 1072 and one or more transponder types 1072 indicating to which transponder the license applies. Further, the license may comprise different sets of access conditions 1076,1084,1090 which may depend on time, location or use of the transponder.

In an embodiment, the license may contain temporal access conditions 1076. These conditions may be linked to a particular transponder function and expiry information 1077, wherein the expiry information determines the point in time up to which access by a user to the transponder function is allowed. Expiry information may comprise the date when access to a particular transponder function will end or will be limited to a certain basic functionality. In the example of FIG. 10, the basic transponder function 1082 is licensed up to 31 Dec. 2016 and the RF link function 1078 and data logging function 1080 are licensed up to 31 Dec. 2014.

In another embodiment, the license may contain location (or geographical) access conditions 1084. In that case, the license with regard to some of the transponder functions is limited to areas defined in the geographic information 1083. For example, in FIG. 10, the RF link function and the data logging functions are limited to a certain area in the Netherlands and France respectively. A geographical area in the license may be defined by coordinates, which can be compared to the location information that is generated by the GPS module in the transponder. The transponder functions may be used in case the location information is within the area.

In yet another embodiment, the license may contain use access conditions 1090. These conditions may define access to certain uses of the transponder. In some embodiments, a predetermined value of a (binary) flag 1091 may be used in order to indicate whether a certain use of the transponder is required or not. For example, in the example in FIG. 10, the flag of a first use access condition 1092 "key contact required" is set to "true" demanding that access to the transponder functions is only possible when the transponder is in contact with the access module. Hence, in this mode the access module may be used as a key to "unlock" access to the transponder functions.

Further, a flag of a second use access condition 1094 "external power source" is set to "true" demanding that the transponder, in particular the power supply (battery) of the transponder, needs to be connected to an external source. A third use access condition 1096 "ISM" may be set to so a certain ISM band indicating that the radio (RF) link of the transponder will use the 2.45 GHz ISM band. A flag of a fourth use 1098 access condition "CAN controller access" may indicate that the transponder may be connected to external devices via the CAN-bus. It is submitted that many transponder functions, services and uses may be controlled on the basis of the license information and that FIG. 10 just illustrates a non-limiting example.

It is submitted that the embodiments in FIG. 1-10 are not limiting. Further, elements of one embodiment may be combined with one or more elements of another embodiment without leaving the scope of the invention. Moreover, the access module may also comprise two or more transponder identifiers so that the access module may provide access to two or more transponders. In an embodiment, the license information may comprise first license information associated with a first transponder and second license information associated with a second transponder. For example, in certain situations a vehicle may comprise more than one transponder, e.g. a transponder and a back-up transponder. In another embodiment, a user may have two or more vehicles with a transponder. In that case, the access conditions may require a connection of the access module to the transponder in order to keep the transponder functions active so that only one transponder can be activated at the same time. This way, the access module may be used as a transponder key for activating transponder functions.

The sports timing transponder may be used for any type of motorized or non-motorized sports events, including but not limited to circuit and off-read racing using cars, karts or motors, biking events, radio control (RC) racing, etc.

Figure 11:
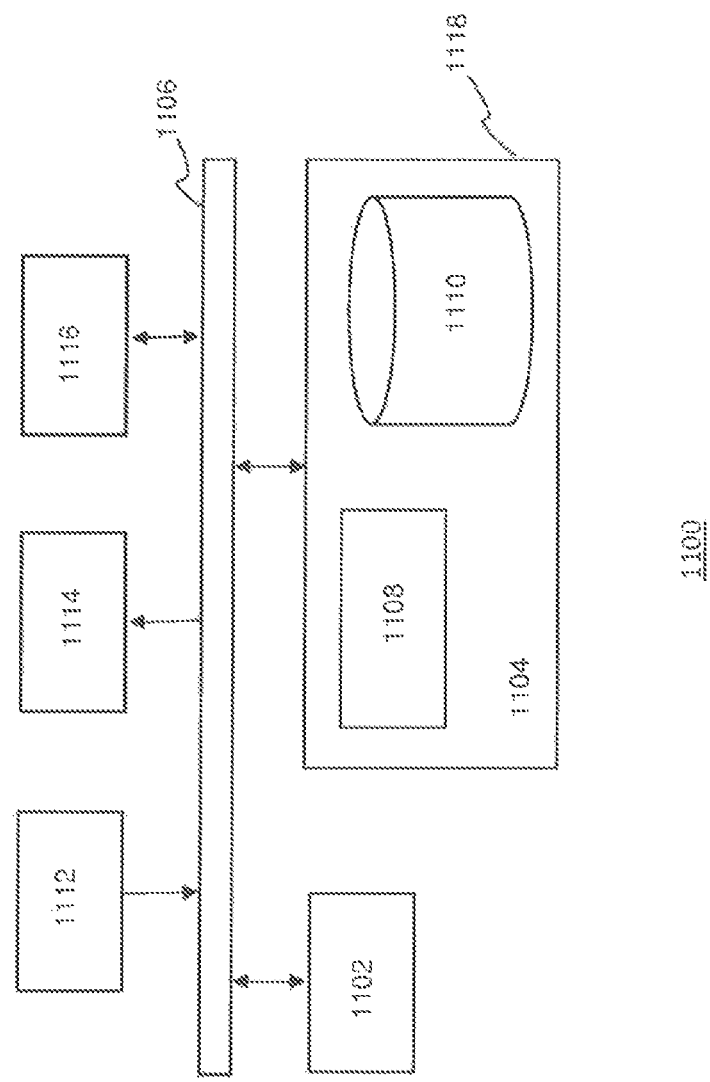
FIG. 11 depicts a block diagram illustrating an exemplary data processing system that may be used in systems and methods as described in this application.

FIG. 11 depicts a block diagram illustrating an exemplary data processing system that may be used in systems and methods as described with reference to FIG. 1-10. The data processing system 1100 may include at least one processor 1102 coupled to memory elements 1104 through a system bus 1006. As such, the data processing system may store program code within memory elements 1104. Further, processor 1102 may execute the program code accessed from memory elements 1104 via system bus 1156. In one aspect, data processing system may be implemented as a computer that is suitable for storing and/or executing program code. It should be appreciated, however, that data processing system may be implemented in the form of any system including a processor and memory that is capable of performing the functions described within this specification.

Memory elements 1104 may include one or more physical memory devices such as, for example, local memory 1108 and one or more bulk storage devices 1110. Local memory may refer to random access memory or other non-persistent memory device(s) generally used during actual execution of the program code. A bulk storage device may be implemented as a hard drive or other persistent data storage device. The processing system may also include one or more cache memories (not shown) that provide temporary storage of at least some program code in order to reduce the number of times program code must be retrieved from bulk storage device 1110 during execution.

Input/output (I/O) devices depicted as input device 1112 and output device 1114 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1116 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system.

As pictured in FIG. 11, memory elements 1104 may store an application 1118. It should be appreciated that data processing system 1100 may further execute an operating system (not shown) that can facilitate execution of the application. Application, being implemented in the form of executable program code, can be executed by data processing system 1100, e.g., by processor 1102. Responsive to executing application, data processing system may be configured to perform one or more operations to be described herein in further detail.

In one aspect, for example, data processing system 1100 may represent a client data processing system. In that case, application 1118 may represent a client application that, when executed, configures data processing system 1100 to perform the various functions described herein with reference to a "client". Examples of a client can include, but are not limited to, a personal computer, a portable computer, a mobile phone, or the like.

In another aspect, data processing system 1100 may represent a server. For example, data processing system 1100 may represent an HTTP server in which case application 1118, when executed, may configure data processing system 1100 to perform HTTP server operations.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for establishing a data link between an access module and a transponder module; comprising:
   the access module connected to a CAN bus sending one or more announce CAN messages over the CAN bus to one or more transponder modules connected to the CAN bus, each of the one or more announce CAN messages comprising a payload, the payload comprising an answer CAN address for dynamically assigning the answer CAN address to one of the one or more transponder modules;
   the access module receiving one or more request CAN messages from the one or more transponder modules wherein each of the one or more transponder modules is associated with a transponder ID, each of the one or more request CAN messages comprising an answer CAN address and a transponder ID of one of the one or more transponder modules; and
   the access module selecting a transponder module based on the one or more request CAN messages for establishing the data link.

2. The method according to claim 1, comprising:
   the access module establishing a data link with the selected transponder module by broadcasting an acknowledge CAN message over said CAN bus, said acknowledge CAN message comprising the transponder ID of said selected transponder.

3. The method according to claim 1, wherein the announce CAN message comprises a CAN ID field, and the CAN ID field comprises the CAN ID of said access module.

4. The method according to claim 1 further comprising:
   the access module receiving one or more request CAN messages over the CAN bus from said one or more transponder modules, the CAN ID field of a request CAN message comprising an answer CAN ID.

5. The method according to claim 1, further comprising:
   in response to receiving said one or more broadcasted announce CAN messages, the one or more transponder modules broadcasting request CAN messages at different time instances to the access module.

6. The method according to claim 1, further comprising:
   at least one of the one or more transponder modules determining the time instance for broadcasting the request CAN message to the access module in response to the reception an announce CAN message on the basis of its transponder ID.

7. The method according to claim 1, wherein the selected transponder module is identified in the request CAN message that is first received by said access module.

8. The method according to claim 1, wherein the access module stablishing a data link between with the selected transponder module for determining whether a user has the right to use at least part of one or more functions in the transponder.

9. The method according to claim 8, wherein determining whether a user has the right to use at least part of one or more functions in the transponder comprises:
   the access module sending time information to the selected transponder module for enabling said transponder module to check whether a user of the transponder module has a right to use at least part of one or more transponder functions.

10. The method according to claim 1, wherein connecting said access module to a CAN bus comprises:
    removably positioning a hardware card comprising the access module in a socket that is configured for receiving the hardware card wherein when the hardware card is positioned in the socket the electrical contacts of the hardware card are in electrical connection with said CAN bus.

11. A transponder module configured for establishing a data link with an access module, the transponder module comprising:
    a CAN interface for electrically connecting the transponder module to a CAN bus that is further connected to one or more transponder modules; and
    a computer readable storage medium having computer readable program code embodied therewith, and a microprocessor, coupled to the computer readable storage medium and the CAN interface, wherein responsive to executing the computer readable program code, the processor is configured to perform executable operations comprising:
       receiving an announce CAN message from the access module, the announce CAN message comprising a payload, the payload comprising an answer CAN address for dynamically assigning the answer CAN address to the transponder module;
       sending a request CAN message over the CAN bus to the access module, the request CAN message comprising the answer CAN address and a transponder ID of the transponder module; and
       receiving an acknowledge CAN message from the access module for establishing a data link, the acknowledge CAN message comprising the transponder ID of the transponder module.

12. The transponder module according to claim 11, wherein the processor is further configured to execute instructions for performing operations comprising:
  determining a time instance for broadcasting said request CAN message over said CAN bus in response to the reception an announce CAN message, the time instance being determined on the basis of said transponder ID.

13. An access module configured for establishing a data link with a transponder module, the access module being configured to activate and/or access at least part of one or more transponder functions in said transponder module, the access module comprising:
  a CAN interface for electrically connecting the transponder module to a CAN bus that is further connected to one or more transponder modules; and
  a computer readable storage medium having computer readable program code embodied therewith, and a microprocessor, coupled to the computer readable storage medium and the CAN interface, wherein responsive to executing the computer readable program code, the processor is configured to perform executable operations comprising:
    sending one or more announce CAN messages over the CAN bus to the one or more transponder module, each of the one or more announce CAN messages comprising a payload, the payload comprising an answer CAN address for dynamically assigning the answer CAN address to a transponder module;
    receiving one or more request CAN messages from the one or more transponder modules, a request CAN message comprising the answer CAN address and a transponder ID of one of the one or more transponder modules; and
    selecting a transponder module based on the one or more request CAN messages for establishing the data link.

14. A socket configured for receiving an access module, the socket being in electrical contact with a CAN bus that is connected to one or more transponders, the socket being configured to removably position the access module in the socket such that when the access module is positioned in the socket, the access module is in electrical contact with the CAN bus-, wherein the access module comprises:
  a CAN interface for electrically connecting the transponder module to a CAN bus that is further connected to one or more transponder modules; and
  a computer readable storage medium having computer readable program code embodied therewith, and a microprocessor, coupled to the computer readable storage medium and the CAN interface, wherein responsive to executing the computer readable program code, the processor is configured to perform executable operations comprising:
    sending one or more announce CAN messages over the CAN bus to the one or more transponder module, each of the one or more announce CAN messages comprising a payload, the payload comprising an answer CAN address for dynamically assigning the answer CAN address to a transponder module;
    receiving one or more request CAN messages from the one or more transponder modules, a request CAN message comprising the answer CAN address and a transponder ID of one of the one or more transponder modules; and,
    selecting a transponder module based on the one or more request CAN messages for establishing a data link between the access module and the selected transponder module.

15. A transponder system for use in a vehicle comprising:
  a transponder connected to a CAN bus;
  an access key communicatively connected to the transponder via the CAN bus; and
  a socket configured to receive the access key and to removably position the access key in the socket wherein when the access key is positioned in the socket, the access key being electrically connected via the CAN bus to the transponder;
  wherein the access key is configured to activate the transponder and/or to configures the transponder based of license information and/or firmware updates stored in the memory of the access key.

16. The method according to claim 1 wherein the CAN ID field of a request CAN message comprises an answer CAN ID.

17. The method according to claim 1, further comprising the access key establishing a data link with the selected transponder module for sending license information associated one or more functions in the transponder.

18. The method according to claim 1, further comprising the access key establishing a data link between the access module and the selected transponder module for sending one or more software updates to the transponder.

19. The method according to claim 9, wherein sending time information comprises encrypted time information associated with a real-time clock in the access module.

* * * * *